(12) United States Patent
Plecko (10) Patent No.: US 11,383,726 B2
(45) Date of Patent: Jul. 12, 2022

(54) OPERATING METHOD FOR A REDUNDANT SENSOR ARRANGEMENT OF A VEHICLE SYSTEM, AND CORRESPONDING REDUNDANT SENSOR ARRANGEMENT

(71) Applicant: Robert Bosch GmbH, Stuttgart (DE)

(72) Inventor: Sven Plecko, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 8 days.

(21) Appl. No.: 16/689,215

(22) Filed: Nov. 20, 2019

(65) Prior Publication Data

US 2020/0164892 A1  May 28, 2020

(30) Foreign Application Priority Data

Nov. 22, 2018  (DE) ...................... 10 2018 220 063.7

(51) Int. Cl.
| | |
|---|---|
| *B60W 50/023* | (2012.01) |
| *B60W 50/02* | (2012.01) |
| *B60R 16/03* | (2006.01) |
| *B60W 50/04* | (2006.01) |

(52) U.S. Cl.
CPC ........... *B60W 50/023* (2013.01); *B60R 16/03* (2013.01); *B60W 50/0205* (2013.01); *B60W 50/04* (2013.01); *B60W 2556/00* (2020.02)

(58) Field of Classification Search
CPC ........................... B60W 50/023; B60W 50/025
See application file for complete search history.

(56) References Cited

U.S. PATENT DOCUMENTS

| | | | |
|---|---|---|---|
| 2017/0043755 A1* | 2/2017 | Sautter | .................... B60T 8/885 |
| 2018/0348754 A1* | 12/2018 | Samii | ................... G05D 1/0077 |
| 2019/0243363 A1* | 8/2019 | Kim | ..................... G05D 1/0077 |

FOREIGN PATENT DOCUMENTS

| | | |
|---|---|---|
| DE | 10 2014 208 391 A1 | 11/2015 |
| DE | 10 2015 202 335 A1 | 8/2016 |

* cited by examiner

*Primary Examiner* — Imran K Mustafa (74) *Attorney, Agent, or Firm* — Maginot, Moore & Beck LLP (57) ABSTRACT

An operating method is for a redundant sensor arrangement of a vehicle system. The sensor arrangement includes two controllers and multiple sensors. Individual sensors of the multiple sensors, in a normal mode of the vehicle system, are each coupled to a controller embodied as a primary controller and, in an emergency mode of the vehicle system, are each coupled to a controller embodied as a secondary controller and are supplied with power. The corresponding controller coupled to the sensors receives and evaluates signals from the individual sensors. Initialization of the sensor arrangement involves an operating voltage being applied to both controllers and a check on the sensor arrangement being performed. The sensors, in a first checking step, are coupled to a first controller and are checked by the latter and decoupled from a second controller, and the first controller subsequently hands over the sensors to the second controller.

11 Claims, 4 Drawing Sheets

OPERATING METHOD FOR A REDUNDANT SENSOR ARRANGEMENT OF A VEHICLE SYSTEM, AND CORRESPONDING REDUNDANT SENSOR ARRANGEMENT

This application claims priority under 35 U.S.C. § 119 to patent application no. DE 10 2018 220 063.7, filed on Nov. 22, 2018 in Germany, the disclosure of which is incorporated herein by reference in its entirety.

The disclosure is based on an operating method for a redundant sensor arrangement of a vehicle system. Moreover, the disclosure relates to a redundant sensor arrangement for a vehicle system.

BACKGROUND

DE 10 2015 202 335 A1 discloses a wheel sensor apparatus that comprises a first sensor element, by means of which at least one first sensor variable for a speed and/or rotation velocity of the wheel is providable to at least one evaluation and/or control apparatus of the vehicle, and an additional second sensor element. In this instance, at least one second sensor variable for the speed and/or rotation velocity of the same wheel is providable to the at least one evaluation and/or control apparatus by means of the second sensor element.

DE 10 20 14 208 391 A1 discloses an apparatus for operating a vehicle, which apparatus comprises a coupling device designed to decouple a speed sensor from a primary power supply of a primary controller of a primary braking control system and to couple said speed sensor to a secondary power supply. Further, a control device is disclosed that is designed to control the coupling device on the basis of an error signal from the primary controller, so that an error in the primary controller can result in the speed sensor being decoupled from the primary power supply and coupled to the secondary power supply.

SUMMARY

The operating method for a redundant sensor arrangement of a vehicle system, as disclosed herein, has the advantage that the possible coupling of a sensor to two controllers allows the availability of the sensor to be increased, in particular for a situation in which one of the controllers fails and the other needs to perform the function of the failed controller. Further, the possible coupling of a sensor to two controllers allows a cost saving while retaining signal availability, since for example no sensors need to be kept available in duplicate, that is to say one independent sensor per controller in each case, for example. Embodiments of the operating method according to the disclosure for a redundant sensor arrangement of a vehicle system allow the possible couplings of the individual sensors to both controllers to be checked during initialization before the vehicle can be released for an autonomous driving mode.

Embodiments of the present disclosure provide an operating method for a redundant sensor arrangement of a vehicle system, which sensor arrangement comprises two controllers and multiple sensors. In this instance, the individual sensors, in a normal mode of the vehicle system, are each coupled to a controller embodied as a primary controller and, in an emergency mode of the vehicle system, are each coupled to a controller embodied as a secondary controller and are supplied with power, wherein the controller coupled to the sensors receives and evaluates signals from the individual sensors. In this context, initialization of the sensor arrangement involves an operating voltage being applied to both controllers and a check on the sensor arrangement being performed. In a first checking step, the sensors are coupled to a first controller and checked by the latter and decoupled from a second controller. Subsequently, the first controller hands over the sensors to the second controller, wherein the sensors, in a second checking step, are decoupled from the first controller and coupled to the second controller and checked by the latter. The initialization of the sensor arrangement is concluded and the individual sensors are coupled to the primary controller if no errors have occurred during the check on the sensor arrangement.

Moreover, a redundant sensor arrangement for a vehicle system for performing the operating method is proposed that comprises two controllers and multiple sensors. The individual sensors, in a normal mode of the vehicle system, are each coupled to a controller embodied as a primary controller and, in an emergency mode of the vehicle system, are each coupled to a controller embodied as a secondary controller and are supplied with power, wherein the controller coupled to the sensors receives and evaluates signals from the individual sensors. In this instance, the operating method is implemented as a computer program in the primary controller and/or in the secondary controller.

A controller can be understood in the present case to mean an electrical device that processes and evaluates recorded sensor signals. The controller can have at least one interface, which may be in hardware and/or software form. When in hardware form, the interfaces may be part of what is known as a system ASIC (application-specific integrated circuit) chip, for example, which contains different functions of the controller. However, it is also possible for the interfaces to be separate integrated circuits or to consist, at least in part, of discrete components. When in software form, the interfaces may be software modules that are present on a microcontroller besides other software modules, for example. Another advantage is a computer program product having program code that is stored on a machine-readable carrier such as a semiconductor memory, a hard-disk memory or an optical memory and is used to perform the evaluation when the program is executed by the controller.

The sensors may be embodied as speed sensors, for example, and arranged on a vehicle wheel, the controllers being able to be two controllers for controlling actuators for producing braking effects for the vehicle, for example a braking force booster, a hydraulic unit or a parking brake.

The measures and developments presented in the dependent claims allow advantageous improvements of the operating method for a redundant sensor arrangement of a vehicle system disclosed herein.

It is particularly advantageous that the controllers each query a present state of the other controller before the sensors are handed over. This allows the handover and acceptance of the sensors to be agreed and coordinated between the two controllers. This querying can be performed for example by means of a data connection, which is embodied as a bus system, for example, between the controllers. Depending on the operating state of the controllers, the individual sensors can then be decoupled from one controller and coupled to the other controller. Moreover, the secondary controller is able, in the normal mode of the vehicle system, to monitor the function of the primary controller. This monitoring can likewise be effected via the data connection between the controllers.

In a further advantageous configuration of the operating method, the sensors are able, in the coupled state, to each be connected to a supply connection via a supply path and to a ground connection of the associated controller via a ground path and to be supplied with power. In this instance, a measuring element for receiving the respective sensor signal is arranged at least in the ground path. Additionally, a measuring element for receiving the respective sensor signal can also be provided in the supply path. The supply path extends in each case from a first controller input to a supply, that is to say a current/voltage source, of the respective controller. The ground path extends from a second controller input of the respective controller to a ground connection. The first and second controllers are therefore both capable of connecting the individual sensors to ground or to a supply and therefore of operating the individual sensors. In the case of a sensor embodied as a speed sensor, there may be provision for four sensors that each detect a speed or rotation speed of a vehicle wheel. In this case, each of the four sensors is connected to associated controller inputs of the first and second controllers. In that event, there is then also fourfold provision for the respective ground and supply paths. The individual measuring elements allow the signals actually generated on the individual sensors to be ascertained. The measuring element can be a measuring resistor or current mirror, for example.

In a further advantageous configuration of the operating method, the sensors can be coupled to the primary controller as first controller in the first checking step and to the secondary controller as second controller in the second checking step. This means that all sensors are first coupled to the primary controller to perform the first checking step and coupled to the secondary controller to perform the second checking step. Subsequently, the sensors are coupled to the primary controller again for the normal mode. Alternatively, the sensors can be coupled to the secondary controller as first controller in the first checking step and to the primary controller as second controller in the second checking step. The alternative embodiment of the check has the advantage that, following the conclusion of the check, the handover of the sensors to the primary controller can be dispensed with, since the sensors are already coupled to the primary controller. As a result, the sensor arrangement is advantageously available faster.

In a further advantageous configuration of the operating method, monitoring of the power supply of the individual connected sensors can be performed in the primary controller. Additionally or alternatively, monitoring of the power supply of the individual sensors coupled to the primary controller can be performed in the secondary controller. To this end, the secondary controller can detect a supply voltage on the individual sensors. To detect the supply voltage, evaluation electronics of the secondary controller can be electrically connected to the individual sensors via a respective switching unit. In this instance, the individual sensors are not connected to the supply path and the ground path of the secondary controller, however. The sensors continue to be supplied with power by the primary controller. If the supply to the sensor by the primary controller fails, then the secondary controller can initiate or prepare acceptance of the sensors faster. Moreover, an absence of information that the primary controller transmits via the data connection can be plausibilized. In addition, in the absence of the supply voltage, the secondary controller can electrically connect a corresponding sensor to the supply connection of the secondary controller via the supply path and to the ground connection of the secondary controller via the ground path.

Exemplary embodiments of the disclosure are depicted in the drawing and are explained in more detail in the description that follows. In the drawing, identical reference signs denote components and elements that perform identical or analogous functions.

DETAILED DESCRIPTION

Figure 1:
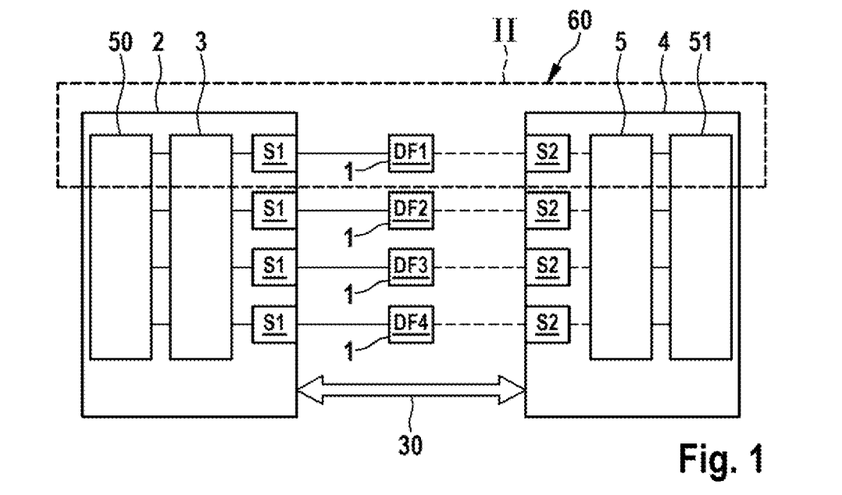
FIG. 1 shows a schematic block diagram of an exemplary embodiment of a redundant sensor arrangement of a vehicle system operated by means of an operating method according to the disclosure.
Figure 2:
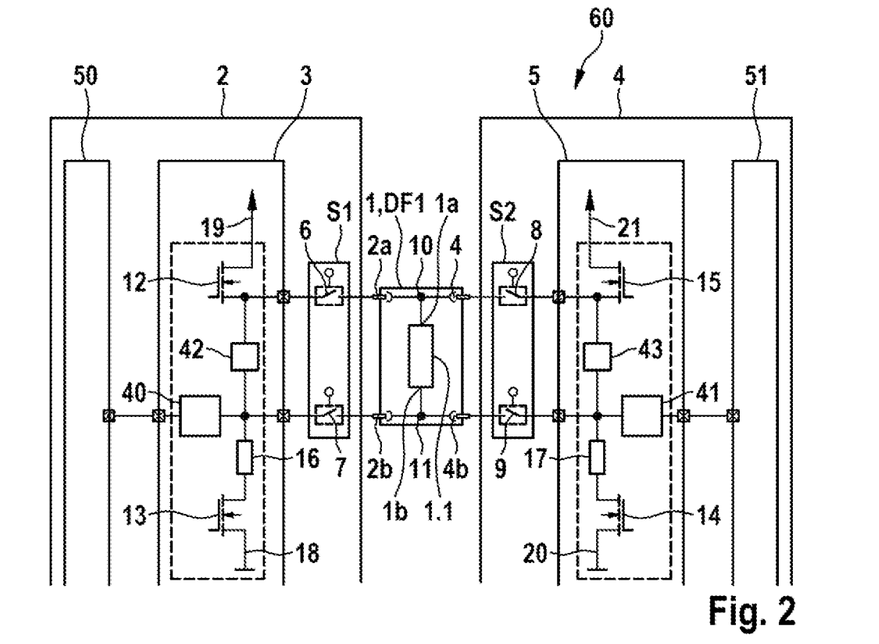
FIG. 2 shows a more detailed depiction of a detail from the redundant sensor arrangement from FIG. 1.

As can be seen from FIGS. 1 and 2, the depicted exemplary embodiment of a redundant sensor arrangement 60 of a vehicle system comprises two controllers and multiple sensors 1. The individual sensors 1, in a normal mode of the vehicle system, are each coupled to a controller embodied as a primary controller 2 and, in an emergency mode of the vehicle system, are each coupled to a controller embodied as a secondary controller 4 and are supplied with power. In this instance, the controller coupled to the sensors 1 receives and evaluates signals from the individual sensors 1. As can furthermore be seen from FIGS. 1 and 2, the redundant sensor arrangement 60 in the depicted exemplary embodiment comprises four sensors 1, embodied as speed sensors DF1, DF2, DF3, DF4, that each have a sensor element 1.1. As can furthermore be seen from FIG. 1, the individual sensors 1 embodied as speed sensors DF1, DF2, DF3, DF4 can each be connected to evaluation electronics of the primary controller 2 via a first switching unit S1, said evaluation electronics in the depicted exemplary embodiment comprising an ASIC chip 3 and an evaluation and control unit 50 embodied as a microprocessor. Moreover, the individual sensors 1 embodied as speed sensors DF1, DF2, DF3, DF4 can each be connected to evaluation electronics of the secondary controller 4 via a second switching unit S2, said evaluation electronics in the depicted exemplary embodiment likewise comprising an ASIC chip 5 and an evaluation and control unit 51 embodied as a microprocessor. The communication between the primary controller 2 and the secondary controller 4 is effected via a data connection 30, which is embodied as a data bus in the depicted exemplary embodiment.

In the depicted exemplary embodiment, the vehicle system corresponds to a vehicle braking system. The primary controller 2 is therefore associated with a hydraulic unit, not depicted, for example an ESP hydraulic unit. The ESP hydraulic unit comprises an option for generating pressure on wheel brake cylinders of a vehicle, for example by means of a hydraulic pump or a plunger. The secondary controller 4 is associated with a controllable braking force booster, for example, not depicted. The controllable braking force booster can be understood to mean an electromechanical, electrohydraulic or else electrically controllable vacuum braking force booster. Conversely, the secondary controller 4 can also be associated with the hydraulic unit and the primary controller 2 can be associated with the braking force booster.

Both the controllable braking force booster and the hydraulic unit are capable of hydraulically causing a buildup of pressure on wheel brake cylinders, not shown, of a motor vehicle. The buildup of pressure can take place on a driver-dependent or else driver-independent basis. A driver-dependent buildup of pressure follows a driver stipulation, for example by means of a brake pedal or a brake lever. A driver-independent buildup of pressure is understood to mean an autonomous buildup of pressure attributable to control signals that are sent to the braking force booster and/or hydraulic unit in the course of emergency braking, or ACC (automated cruise control) control, for example. A driver-independent buildup of pressure may also be necessary in the sphere of highly and/or partially automated driving. The buildup of pressure by the braking force booster and the hydraulic unit can take place on the same wheel brake cylinders, in particular. As such, both the braking force booster and the hydraulic unit can build up braking pressure on a wheel brake cylinder. In particular, the braking force booster may be hydraulically connected to a main brake cylinder upstream of the hydraulic unit in series. This allows a buildup of braking pressure to be redundantly accepted from two different actuators (braking force booster and hydraulic unit).

The braking system further has, on each wheel, at least one sensor 1, for example in the form of a speed sensor DF1, DF2, DF3, DF4, that is capable of detecting the rotation speed of the wheel. Different measurement principles can be applied in this case, for example sensors based on GMR, TMR, AMR technology, or else sensors based on the Hall effect.

As can furthermore be seen from FIG. 2, the individual sensors 1, which are embodied in exemplary fashion as speed sensors DF1, DF2, DF3, DF4, each have a sensor element 1.1 and two connections 1a and 1b for signal lines, wherein a first connection 1a is connected to a first node 10 and a second connection 1b is connected to a second node 11. The nodes 10, 11 are each connected to an input 2a, 2b of the primary controller 2 and to an input 4a, 4b of the secondary controller 4. In this instance, the first connection 1a of the sensor 1 is connected to a first input 2a of the primary controller 2 and to a first input 4a of the secondary controller 4 via the first node 10. The second connection 1b of the sensor 1 is connected to a second input 2b of the primary controller 2 and to a second input 4b of the secondary controller 4 via the second node 11.

In the depicted exemplary embodiment of the redundant sensor arrangement 60, the first switching units S1 are arranged in the primary controller 2 and the second switching units S2 are arranged in the secondary controller 4. Alternatively, the first switching units S1 and the second switching units S2 can be arranged, in an exemplary embodiment that is not depicted, only within one controller, i.e. either within the primary controller 2 or within the secondary controller 4. In a further exemplary embodiment, not depicted, the first switching units S1 and the second switching units S2 can be relocated from the controllers to an additional changeover assembly. Moreover, the nodes 10, 11, which are arranged within the sensors 1 in the depicted exemplary embodiment, can also be arranged either in the primary controller 2 or in the secondary controller 4 or in the additional changeover assembly. Additionally, the nodes 10, 11 can also be inserted directly into the applicable lines as star points or branch points. In the alternative exemplary embodiments, not depicted, the controllers are connected to one another and to the additional changeover assembly via additional direct connecting lines so that the sensor signals of the switchable sensors 1 can be transmitted to both controllers for evaluation.

The signal characteristic within the primary controller 2 and the secondary controller 4 is described below with the inclusion of the sensor 1.

As can furthermore be seen from FIG. 2, the primary controller 2 has a ground connection 18, which can also be understood to mean a ground path or sensor signal path. From there, an electrical connection is routed to a first transistor 13, which is embodied as a MOSFET, for example. The first transistor 13 can also be understood to mean a switch. The first transistor 13 is connected to a measuring element 16, which may be embodied as a nonreactive resistor or current mirror. The first transistor 13 and the measuring element 16 are part of the ASIC chip 3 within the primary controller 2 in the depicted exemplary embodiment. From the measuring element 16, the connection is then routed to a switch 7 of the first switching unit S1. The switch 7 can break the connection from the measuring element 16 to the second input 2b of the primary controller 2, the second sensor connection 1b being connected to the second input 2b of the primary controller 2. The switch 7 can therefore be used to make or break the connection between the sensor 1 and the ground connection 18 of the primary controller 2. The electrical connection extends from the second input 2b of the primary controller 2 to the second sensor connection 1b via the second node 11. The sensor 1 then routes the electrical connection from the first sensor connection 1a to the first input 2a of the primary controller 2 via the first node 10. The second input 2a of the primary controller 2 is connected to a further switch 6 of the first switching unit S1. The switch 6 connects the first input 2a to a second transistor 12, which is in turn connected via a supply connection 19 to a current and/or voltage source, for example to a vehicle electrical system or a vehicle battery. The switch 6 can also be used to make and/or break the electrical connection between the first sensor connection 1a and the supply connection 19 to the voltage and/or current source. The second transistor 12 is likewise part of the ASIC chip 3 in the depicted exemplary embodiment.

As can furthermore be seen from FIG. 2, the secondary controller 4 likewise has a ground connection 20, which can also be understood to mean a ground path or sensor signal path. From there, an electrical connection is routed to a first transistor 14, which is embodied as a MOSFET, for example. The first transistor 14 is connected to a measuring element 17, which is embodied as a nonreactive resistor or current mirror, for example. The first transistor 14 and the measuring element 17 are part of the ASIC chip 5 within the secondary controller 4 in the depicted exemplary embodiment. From the measuring element 17, the connection is then routed to a first switch 9 of the second switching unit S2. The first switch 9 can break the connection between the measuring element 17 and the second input 4b of the secondary controller 4, the second sensor connection 1b being connected to the second input 4b of the secondary controller 4. The first switch 9 can therefore be used to make or break the connection between the sensor 1 and the ground connection 20 of the secondary controller 4.

The electrical connection extends from the second input 4b of the secondary controller 4 to the second sensor connection 1b via the second node 11. The sensor 1 then routes the electrical connection from the first sensor connection 1a to the first input 4a of the secondary controller 4 via the first node 10. The first input 4a of the secondary controller 4 is connected to a second switch 8 of the second switching unit S2. The second switch 8 connects the first input 4a to a second transistor 15, which is connected via a supply connection 21 to a current and/or voltage source, for example to a vehicle electrical system or a vehicle battery. The second switch 8 can also be used to make and/or break the electrical connection between the first sensor connection 1a and the supply connection 21 to the voltage and/or current source. The second transistor 15 is likewise part of the ASIC chip 5 in the depicted exemplary embodiment.

The primary controller 2 and the secondary controller 4 may be of symmetrical design—as described in the present case. Appropriate switching of the switches 6, 7 of the first switching unit S1 in the primary controller 2 and of the switches 8, 9 of the second switching unit S2 in the secondary controller 4 allows the sensor 1 connected to the primary controller 2 and the secondary controller 4 via the nodes 10, 11 to be coupled either to the primary controller 2 or to the secondary controller 4. If the switches 6, 7 of the first switching unit S1 in the primary controller 2 are closed and the switches 8, 9 of the second switching unit S2 in the secondary controller 4 are open, then the sensor 1 is electrically connected to the ASIC chip 3 in the primary controller 2 and decoupled from the secondary controller 4. If additionally the first transistor 13 and the second transistor 12 in the ASIC chip 3 of the primary controller 2 are on, then the sensor 1 is electrically connected to the supply path and the ground path of the primary controller 2 and coupled to the primary controller 2. In the coupled state, the sensor signal received by the measuring element 16 is conditioned by an associated logic circuit 40 and output to the evaluation and control unit 50 of the primary controller 2. In the exemplary embodiment depicted, the logic circuit 40 is likewise part of the ASIC chip 3 within the primary controller 2. Moreover, the ASIC chip 3 in the exemplary embodiment depicted has a monitoring circuit 42 that can be used in the primary controller 2 to ascertain the power supply of the associated sensor 1. In the depicted exemplary embodiment, the monitoring circuit 42 detects the voltage applied to the sensor 1 when the switches 6, 7 of the first switching unit S1 are closed.

If, by contrast, the switches 6, 7 of the first switching unit S1 in the primary controller 2 are open, and the switches 8, 9 of the second switching unit S2 in the secondary controller 4 are closed, then the sensor 1 is electrically connected to the ASIC chip 5 in the secondary controller 4 and decoupled from the primary controller 2. If, additionally, the first transistor 14 and the second transistor 15 in the ASIC chip 5 of the secondary controller 4 are on, then the sensor 1 is electrically connected to the supply path and the ground path of the secondary controller 4 and coupled to the secondary controller 4. In the coupled state, the sensor signal received by the measuring element 17 is conditioned by an associated logic circuit 41 and output to the evaluation and control unit 51 of the secondary controller 4. In the depicted exemplary embodiment, the logic circuit 41 is likewise part of the ASIC chip 5 within the secondary controller 4. Moreover, the ASIC chip 5 in the depicted exemplary embodiment has a monitoring circuit 43 that can be used in the secondary controller 4 to ascertain the power supply of the associated sensor 1. In the depicted exemplary embodiment, the monitoring circuit 43 detects the voltage applied to the sensor 1 when the switches 8, 9 of the second switching unit S2 are closed.

In exemplary embodiments of the operating method 100, 200 according to the disclosure for a redundant sensor arrangement 60 of a vehicle system, the initialization of the sensor arrangement 1 involves an operating voltage being applied to both controllers and a check on the sensor arrangement 60 being performed. In this instance, the sensors 1, in a first checking step, are coupled to a first controller and checked by the latter and decoupled from a second controller. Subsequently, the first controller hands over the sensors 1 to the second controller, wherein the sensors 1, in a second checking step, are decoupled from the first controller and coupled to the second controller and checked by the latter. The initialization of the sensor arrangement 60 is concluded and the individual sensors 1 are coupled to the primary controller 2 if no errors have occurred during the check on the sensor arrangement 60.

Figure 3:
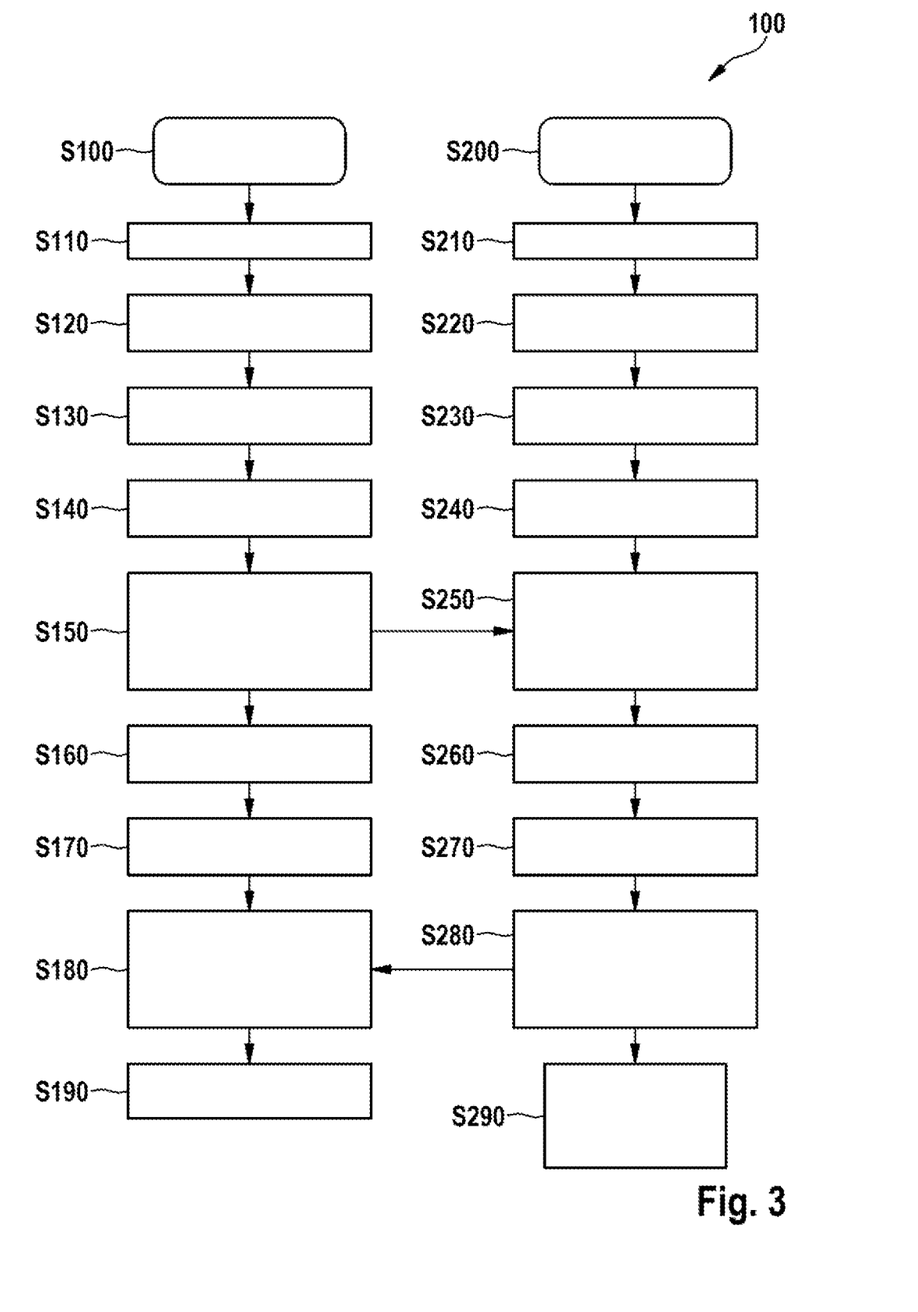
FIG. 3 shows a schematic flowchart for a first exemplary embodiment of an operating method according to the disclosure for a redundant sensor arrangement of a vehicle system from FIGS. 1 and 2.

As can be seen from FIG. 3, in the depicted first exemplary embodiment of the operating method 100 according to the disclosure for a redundant sensor arrangement 60 of a vehicle system, a step S100 involves the primary controller 2, and a parallel or simultaneous step S200 involves the secondary controller 4, being switched on or applied to the operating voltage. In step S110, it is established that the primary controller 2 is ready, which means that the internal circuits, such as the first switching units S1, the ASIC chip 3 and the evaluation and control unit 50, of the primary controller 2 have started up and can perform and undertake their intended functions and tasks. In a parallel or simultaneous step S210, it is established that the secondary controller 4 is ready, which means that the internal circuits, such as the second switching units S2, the ASIC chip 5 and the evaluation and control unit 51, of the secondary controller 4 have started up and can perform and undertake their intended functions and tasks.

Thus, in the depicted first exemplary embodiment, all the sensors 1 are coupled to the primary controller 2 in step S120. This means that the switches 6, 7 of the first switching units S1 are closed and the individual sensors 1 connected to the inputs 2A, 2B of the primary controller 2 are connected to the ASIC chip 3. Within the ASIC chip 3, the transistors 12, 13 are turned on in order to connect each of the individual sensors 1 to the supply connection 19 via the supply path and to the ground connection 18 via the ground path. After the sensors 1 are coupled to the primary controller 2, standard tests are performed for the coupled sensors 1 in step S130. The standard tests can involve the signals from the coupled sensors 1 being received on the measuring elements 16, for example, and evaluated by the logic circuit 40 and the evaluation and control unit 50.

In parallel or simultaneously, all the sensors 1 are decoupled from the secondary controller 4 in step S220. This means that the switches 8, 9 of the second switching units S2 are opened and the individual sensors 1 connected to the inputs 4A, 4B of the secondary controller 4 are isolated from the ASIC chip 5, so that all the sensors 1 are decoupled from the secondary controller 4 in step S230.

If all the coupled sensors 1 pass the standard tests in the primary controller 2, the respective state of the other controller is queried, in the depicted first exemplary embodiment, in steps S140 and S240 in order to prepare the sensor handover. This means that the primary controller 2 queries the state of the secondary controller 4 in step S140 and the secondary controller 4 queries the state of the primary controller 2 in step S240. If both controllers are ready, then the primary controller 2 hands over the sensors 1 to the secondary controller 4 in step S150. To hand over the sensors 1 to the secondary controller 4, the sensors 1 are decoupled from the primary controller 2. This means that the switches 6, 7 of the first switching units S1 are opened and the sensors 1 are isolated from the ASIC chip 3 and thus decoupled from the primary controller 2. Additionally, the transistors 12, 13 in the ASIC chip 3 are turned off. Thus, all the sensors 1 are decoupled from the primary controller 2 in step S160. The secondary controller 4 accepts the sensors 1 in step S250. To accept the sensors 1 from the primary controller 2, the sensors 1 are coupled to the secondary controller 4. This means that the switches 8, 9 of the second switching units S2 are closed and the individual sensors 1 connected to the inputs 4A, 4B of the secondary controller 4 are connected to the ASIC chip 5. Within the ASIC chip 5, the transistors 14, 15 are turned on in order to connect each of the individual sensors 1 to the supply connection 21 via the supply path and to the ground connection 20 via the ground path. After the sensors 1 are coupled to the secondary controller 4, standard tests are performed for the coupled sensors 1 in step S260. The standard tests can involve the signals from the coupled sensors 1 being received on the measuring elements 17, for example, and evaluated by the logic circuit 41 and the evaluation and control unit 51.

If all the coupled sensors 1 pass the standard tests in the secondary controller 4, the actual initialization of the sensor arrangement 60 has concluded and the sensors 1 are coupled to the primary controller 2 in order to execute the normal mode. Thus, in the depicted first exemplary embodiment, the respective state of the other controller is queried in steps S170 and S270 in order to prepare the sensor handover. This means that the primary controller 2 queries the state of the secondary controller 4 in step S170 and the secondary controller 4 queries the state of the primary controller 2 in step S270. If both controllers are ready, the secondary controller 4 hands over the sensors 1 to the primary controller 2 in step S280. To hand over the sensors 1 to the primary controller 2, the sensors 1 are decoupled from the secondary controller 4. This means that the switches 8, 9 of the second switching units S2 are opened and the sensors 1 are isolated from the ASIC chip 5 and thus decoupled from the secondary controller 4. Additionally, the transistors 14, 15 in the ASIC chip 5 are turned off. The primary controller 2 accepts the sensors 1 in step S180. To accept the sensors 1 from the secondary controller 4, the sensors 1 are coupled to the primary controller 2. This means that the switches 6, 7 of the first switching units S1 are closed and the individual sensors 1 connected to the inputs 2A, 2B of the primary controller 2 are connected to the ASIC chip 3. Within the ASIC chip 3, the transistors 12, 13 are turned on in order to connect each of the individual sensors 1 to the supply connection 19 via the supply path and to the ground connection 18 via the ground path. After the sensors 1 are accepted, the primary controller 2 undertakes its tasks in the normal mode in step S190 and the braking system is ready to perform its intended braking functions to the full extent. After the sensors are handed over, the secondary controller 4 changes in step S290, in the depicted first exemplary embodiment, to its intended monitoring mode, in which the secondary controller 4 monitors the data bus and the operation of the primary controller 2. As a result, the secondary controller 4 is able to undertake at least part of the function of the primary controller 2 and to execute the emergency mode if the primary controller 2 fails.

Figure 4:
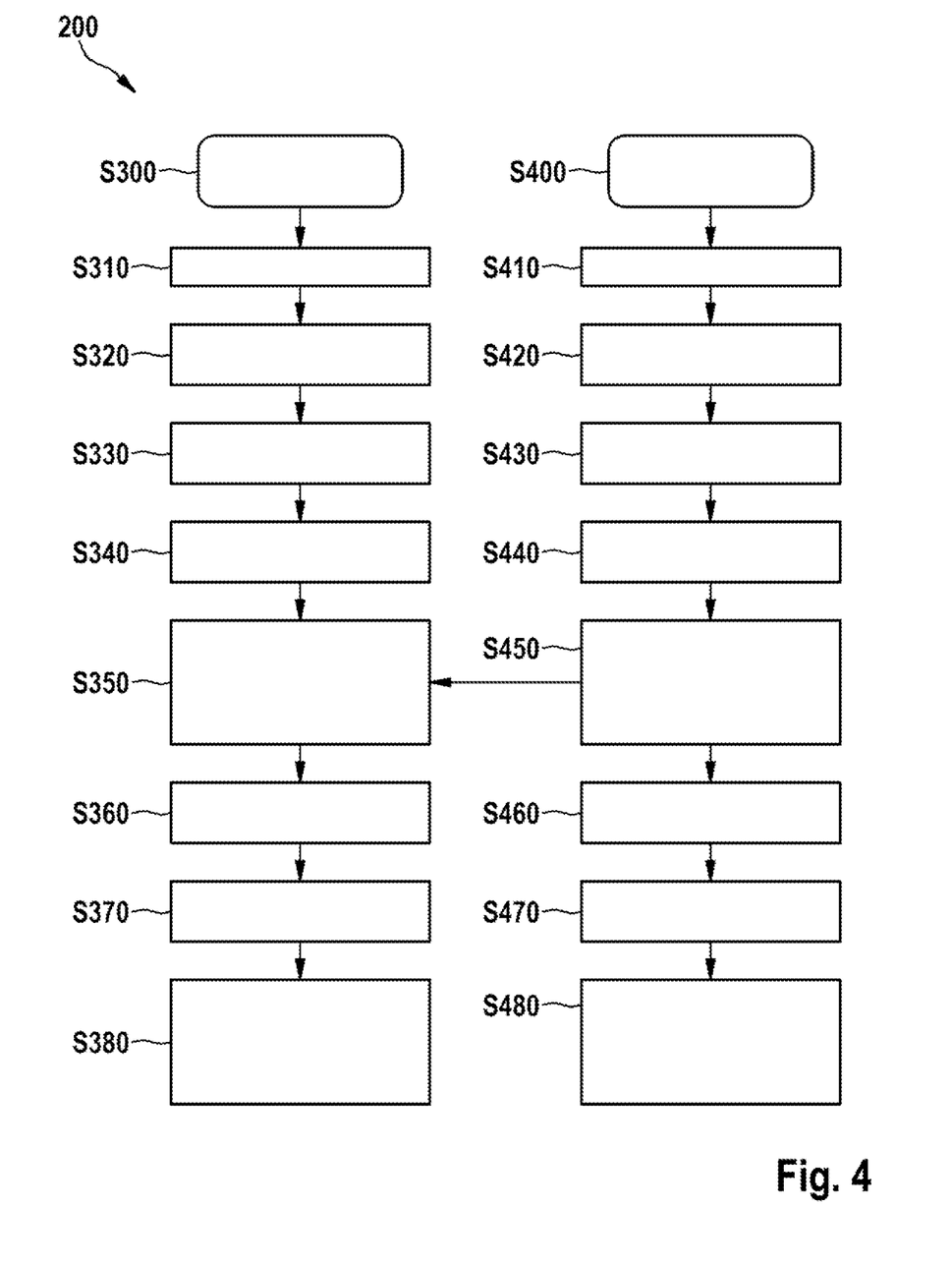
FIG. 4 shows a schematic flowchart for a second exemplary embodiment of an operating method according to the disclosure for a redundant sensor arrangement of a vehicle system from FIGS. 1 and 2.

As can be seen from FIG. 4, in the depicted second exemplary embodiment of the operating method 200 according to the disclosure for a redundant sensor arrangement 60 of a vehicle system, a step S300 involves the primary controller 2, and a parallel or simultaneous step S400 involves the secondary controller 4, being switched on or applied to the operating voltage. In step S310, it is established that the primary controller 2 is ready, which means that the internal circuits, such as the first switching units S1, the ASIC chip 3 and the evaluation and control unit 50, of the primary controller 2 have started up and can perform and undertake their intended functions and tasks. In a parallel or simultaneous step S410, it is established that the secondary controller 4 is ready, which means that the internal circuits, such as the second switching units S2, the ASIC chip 5 and the evaluation and control unit 51, of the secondary controller 4 have started up and can perform and undertake their intended functions and tasks.

Thus, in the depicted second exemplary embodiment, all the sensors 1 are coupled to the secondary controller 4 in step S420. This means that the switches 8, 9 of the second switching units S2 are closed and the individual sensors 1 connected to the inputs 4A, 4B of the secondary controller 4 are connected to the ASIC chip 5. Within the ASIC chip 5, the transistors 14, 15 are turned on in order to connect each of the individual sensors 1 to the supply connection 21 via the supply path and to the ground connection 20 via the ground path. After the sensors 1 are coupled to the secondary controller 4, appropriate standard tests are performed for the coupled sensors 1 in step S430. The standard tests can involve the signals from the coupled sensors 1 being received on the measuring elements 17, for example, and evaluated by the logic circuit 41 and the evaluation and control unit 51.

In parallel or simultaneously, all the sensors 1 are decoupled from the primary controller 2 in step S320. This means that the switches 6, 7 of the first switching units S1 are opened and the individual sensors 1 connected to the inputs 2A, 2B of the primary controller 2 are isolated from the ASIC chip 3, so that all the sensors 1 are decoupled from the primary controller 2 in step S330.

If all the coupled sensors 1 pass the standard tests in the secondary controller 4, then, in the depicted second exemplary embodiment, the respective state of the other controller is queried in steps S340 and S440 in order to prepare the sensor handover. This means that the primary controller 2 queries the state of the secondary controller 4 in step S340 and the secondary controller 4 queries the state of the primary controller 2 in step S40. If both controllers are ready, then the secondary controller 4 hands over the sensors 1 to the primary controller 2 in step S450. To hand over the sensors 1 to the primary controller 2, the sensors 1 are decoupled from the secondary controller 4. This means that the switches 8, 9 of the second switching units S2 are opened and the sensors 1 are isolated from the ASIC chip 5 and thus decoupled from the secondary controller 4. Additionally, the transistors 14, 15 in the ASIC chip 5 are turned off. Thus, all the sensors 1 are decoupled from the secondary controller 4 in step S460. The primary controller 2 accepts the sensors 1 in step S350. To accept the sensors 1 from the secondary controller 4, the sensors 1 are coupled to the primary controller 2. This means that the switches 7, 7 of the first switching units S1 are closed and the individual sensors 1 connected to the inputs 2A, 2B of the primary controller 2 are connected to the ASIC chip 3. Within the ASIC chip 3, the transistors 12, 13 are turned on in order to connect each of the individual sensors 1 to the supply connection 19 via the supply path and to the ground connection 18 via the ground path. After the sensors 1 are coupled to the primary controller 2, standard tests are performed for the coupled sensors 1 in step S360. The standard tests can involve the signals from the coupled sensors 1 being received on the measuring elements 16, for example, and evaluated by the logic circuit 40 and the evaluation and control unit 50.

If all the coupled sensors 1 pass the standard tests in the primary controller 2, the actual initialization of the sensor arrangement 60 has concluded. Since, in the depicted second exemplary embodiment, the sensors 1 are already coupled to the primary controller 2 in order to execute the normal mode, fresh handover of the sensors 1 can be dispensed with. Thus, in the depicted second exemplary embodiment, the respective state of the other controller is queried in steps S370 and S470 in order to prepare the normal mode. This means that the primary controller 2 queries the state of the secondary controller 4 in step S370 and the secondary controller 4 queries the state of the primary controller 2 in step S470. If both controllers are ready, the primary controller 2 undertakes its tasks in the normal mode in step S380 in the depicted second exemplary embodiment and the braking system is ready to perform its intended braking functions to the full extent. Moreover, the secondary controller 4, in the depicted second exemplary embodiment, changes in step S480 to its intended monitoring mode, in which the secondary controller 4 monitors the data bus and the operation of the primary controller 2. As a result, the secondary controller 4 is able to undertake at least part of the function of the primary controller 2 and to execute the emergency mode if the primary controller 2 fails.

Figure 5:
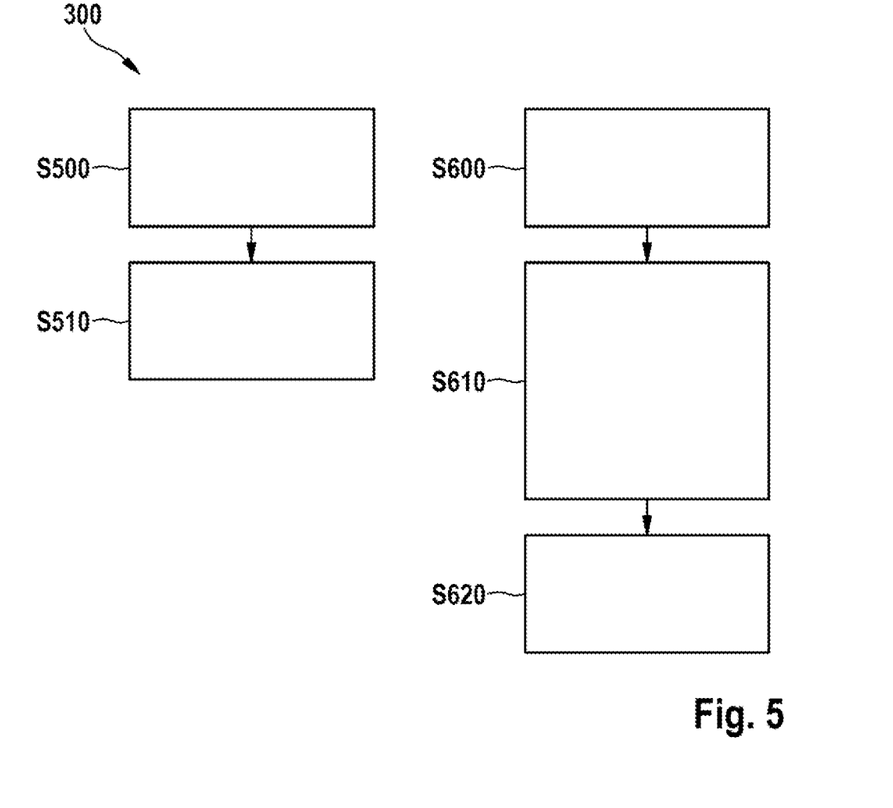
FIG. 5 shows a schematic flowchart for a third exemplary embodiment of an operating method according to the disclosure for a redundant sensor arrangement of a vehicle system from FIGS. 1 and 2.

As can be seen from FIG. 5, the operating method 300 according to the disclosure for a redundant sensor arrangement 60 of a vehicle system in the depicted third exemplary embodiment is based, in step S500, on the normal mode of the primary controller 2 in accordance with step S190 in the first exemplary embodiment of the operating method 100 according to the disclosure or in accordance with step S380 in the second exemplary embodiment of the operating method 300 according to the disclosure. In a parallel or simultaneous step S600, the operating method 300 is based on the monitoring mode of the secondary controller 4 in accordance with step S290 in the first exemplary embodiment of the operating method 100 according to the disclosure or in accordance with step S480 in the second exemplary embodiment of the operating method 300 according to the disclosure. In step S510, additional ongoing monitoring of the sensor supply is performed in the primary controller 4. To this end, the monitoring circuits 42 in the ASIC chip 3 detect the voltages applied to the individual sensors 1 across the closed switches 6, 7 of the first switching units S1. Additionally, additional redundant monitoring of the sensor supply is performed in the secondary controller 4 in step S610. To this end, the switches 8, 9 of the second switching units S2 are closed in step S610, so that the monitoring circuits 44 in the ASIC chip 5 of the secondary controller 4 is able to detect and evaluate the voltages applied to the individual sensors 1. The transistors 14, 15 in the ASIC chip 5 remain in the off state, so that the sensor signals received in the primary controller 2 are not adversely influenced by the voltage measurement in the secondary controller 4. Thus, the secondary controller 4, in the depicted third exemplary embodiment, changes in step S620 to its intended extended monitoring mode, in which the secondary controller 4 monitors the data bus and the operation of the primary controller 2 and the sensor supply. Redundant monitoring of the sensor supply by both controllers is therefore possible. If the supply to the individual sensors 1 by the primary controller 2 fails, the secondary controller 4 can initiate or prepare acceptance of the sensors 1 faster.

As such, in the absence of the supply voltage, the secondary controller 4 can electrically connect a corresponding sensor 1 to the supply connection 21 of the secondary controller 4 via the supply path and to the ground connection 20 of the secondary controller 4 via the ground path and can provide the supply to the sensor 1 and evaluate the sensor signals.

The described exemplary embodiments of the operating method 100, 200, 300 can be implemented for example in software or hardware or in a hybrid form comprising software and hardware in the primary controller 2 and/or in the secondary controller 4.

What is claimed is:

1. An operating method for a redundant sensor arrangement of a vehicle system including two controllers and multiple sensors, the method comprising:
    coupling individual sensors of the multiple sensors, in a normal mode of the vehicle system, to a controller of the two controllers embodied as a primary controller;
    coupling the individual sensors, in an emergency mode of the vehicle system, to a controller of the two controllers embodied as a secondary controller;
    supplying the individual sensors with power;
    receiving and evaluating signals from the individual sensors with the corresponding controller coupled to the sensors;
    applying an operating voltage to both controllers and performing a checking process on the sensor arrangement during an initialization of the sensor arrangement;
    in a first part of the checking process, coupling the individual sensors to a first controller of the two controllers while decoupling the individual sensors from a second controller of the two controllers, and then checking the individual sensors with the first controller;
    in a second part of the checking process, coupling the individual sensors to the second controller while decoupling the individual sensors from the first controller, and then checking the individual sensors with the second controller; and
    concluding the initialization of the sensor arrangement and coupling the individual sensors to the primary controller when no errors occur during the check on the sensor arrangement.

2. The operating method according to claim 1, wherein the controllers each query a present state of the other controller before the individual sensors are handed over.

3. The operating method according to claim 1, further comprising:
    monitoring operation of the primary controller with the secondary controller in the normal mode of the vehicle system.

4. The operating method according to claim 1, further comprising:
    connecting each of the sensors, in a coupled state, to a supply connection via a supply path and to a ground connection of the associated controller via a ground path and supplying the sensors with power; and
    receiving the respective signals from the individual sensors with a measuring element arranged at least in the ground path.

5. The operating method according to claim 1, further comprising:
    coupling the individual sensors to the primary controller as the first controller in the first checking process; and coupling the individual sensors to the secondary controller as the second controller in the second checking process.

6. The operating method according to claim 1, further comprising:
coupling the individual sensors to the secondary controller as the first controller during the first checking process; and
coupling the individual sensors to the primary controller as the second controller during the second checking process.

7. The operating method according to claim 1, further comprising:
monitoring a power supply of the individual sensors in the primary controller.

8. The operating method according to claim 4, further comprising:
monitoring a power supply of the individual sensors coupled to the primary controller with the secondary controller; and
detecting a supply voltage on the individual sensors with the secondary controller.

9. The operating method according to claim 8, wherein evaluation electronics of the secondary controller are electrically connected to the individual sensors via a respective switching unit to detect the supply voltage on the individual sensors.

10. The operating method according to claim 8, wherein in an absence of the supply voltage, the secondary controller electrically connects a corresponding sensor of the individual sensors to a supply connection of the secondary controller via the supply path and to the ground connection of the secondary controller via the ground path.

11. A redundant sensor arrangement for a vehicle system, comprising:
two controllers; and
multiple sensors,
wherein individual sensors of the multiple sensors, in a normal mode of the vehicle system, are each coupled to a controller of the two controllers embodied as a primary controller and are supplied with power,
wherein the individual sensors in an emergency mode of the vehicle system, are each coupled to a controller of the two controllers embodied as a secondary controller and are supplied with power,
wherein the corresponding controller of the two controllers coupled to the individual sensors receives and evaluates signals from the individual sensors,
wherein an operating method for the redundant sensor arrangement is implemented as a computer program in the primary controller and/or in the secondary controller and includes
applying an operating voltage to both controllers and performing a checking process on the sensor arrangement during an initialization of the sensor arrangement,
in a first part of the checking process, coupling the individual sensors to a first controller of the two controllers while decoupling the individual sensors from a second controller of the two controllers, and then checking the individual sensors with the first controller,
in a second part of the checking process, coupling the individual sensors to the second controller while decoupling the individual sensors from the first controller, and then checking the individual sensors with the second controller, and
concluding the initialization of the sensor arrangement and coupling the individual sensors to the primary controller when no errors occur during the check on the sensor arrangement.

* * * * *